TUNABLE FILTER ARRANGEMENT

Filed Dec. 18, 1959 3 Sheets-Sheet 1

INVENTOR:
MAJOR A. JOHNSON,
BY Michael Masnik
HIS ATTORNEY.

INVENTOR:
MAJOR A. JOHNSON,
BY Michael Masnik
HIS ATTORNEY.

INVENTOR:
MAJOR A. JOHNSON,
BY Michael Masnik
HIS ATTORNEY.

United States Patent Office 3,086,172
Patented Apr. 16, 1963

3,086,172

TUNABLE FILTER ARRANGEMENT

Major A. Johnson, East Syracuse, N.Y., assignor to General Electric Company, a corporation of New York Filed Dec. 18, 1959, Ser. No. 860,552
9 Claims. (Cl. 328—22)

This invention relates to signal processing methods and arrangements, and particularly to methods and arrangements for tuning through a band of signal frequencies for purposes of investigating the occurrence of any signals in the band.

It is oftentimes desirable in the electrical arts to identify the existence of signals having particular characteristics. For example, it is oftentimes desired to detect the existence of a signal of a given frequency in a background of noise or undesired signals. One method for isolating and detecting desired signals is to employ a series of relatively narrow band filters, each covering a discrete portion of the overall bandwidth under investigation. By observing the outputs of the various filters, the existence of the desired signal can be detected and the frequency identified.

In some instances it is desirable to have an adjustable filter arrangement in order that the filter may be more exactly matched to the signals to be identified, regardless of their position in the frequency spectrum under observation. This feature is particularly desirable where a plurality of signals occurring in different parts of the band under investigation are to be studied. One arrangement which is useful in studying signals occurring in a given frequency band is disclosed in a copending application of Sidney Applebaum, Serial No. 708,733, now U.S. Patent Number 3,026,475, entitled "Frequency Scanning Filter Arrangement" and assigned to the same assignee. The arrangement shown in this co-pending application is particularly useful where the signal to be investigated is undergoing shift in frequency. The frequency scanning filter arrangement disclosed is capable of recurrently placing the signals under investigation for purposes of analysis or utilization. Sometimes, however, it is desirable to select a desired portion of the frequency band under investigation for purposes of relatively continuous observation or study. The scanning filter arrangement obviously may not be suitable. It is therefore an object of my invention to provide an improved tunable filter arrangement and method.

It is another object of my invention to provide an improved signal processing arrangement and method.

It is a further object of my invention to provide a filter arrangement whose frequency pass characteristic can be programmed.

It is a further object of my invention to provide an improved arrangement for selectively detecting the existence of signals in accordance with their frequency.

Briefly, in accordance with one embodiment of the invention a frequency scanning filter arrangement, such as that disclosed in the aforementioned co-pending application now a patent, of Sidney Applebaum, is employed in part to derive from a given input signal a plurality of output signals having equal increments of time delay and equal increments of angle between respective ones of said plurality of output signals, and wherein the increment of angle varies as a predetermined function of time. Means are provided for mixing each of said output signals with suitable modulating signals to provide a plurality of signals of the same frequency as the input signal but with a relative angle between said signals which is adjustable.

For a better understanding of my invention reference is made to the following description taken in connection with the accompanying drawings and the appended claims wherein:

FIG. 1 graphically illustrates certain principles of the present invention;

Figure 1:
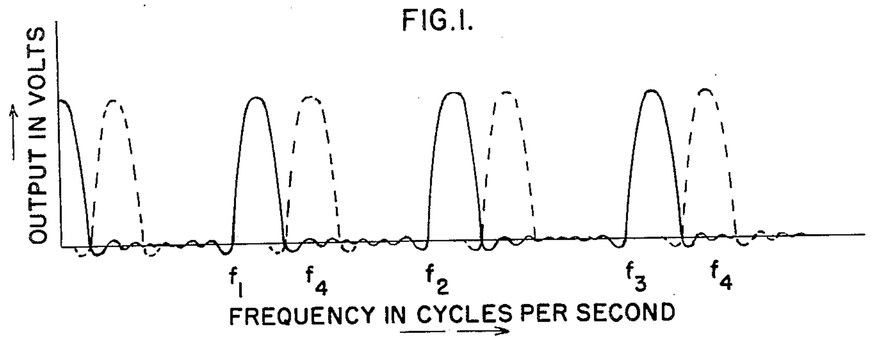

Referring now to FIG. 1 there is shown a frequency response characteristic of a time invariant transverse comb filter. This figure illustrates the voltage amplitude of the output signals (plotted as ordinate) passed by the filter in response to the input signals of different frequency (plotted as abscissa). The characteristic indicates that at frequencies $f_1$, $f_2$, $f_3$, the filter exhibits maximum outputs. Thus, if it is desired to detect the presence of a signal, as for example frequency $f_2$, the unknown signal is applied to the filter arrangement having the characteristic described. Detection of a maximum output indicates the presence of an input signal at frequency $f_2$. Similarly, if signals of frequency $f_1$ or $f_3$ are present they will be detected by the comb filter as a maximum output. However, should a signal be present of a frequency intermediate the peaks of the filter response characteristic, as for example at frequency $f_4$, the filter would not permit identification of this frequency. In accordance with the present invention means and methods are provided for shifting the peaks of the frequency response characteristic to accommodate the desired frequency $f_4$. The shifted response characteristic is shown in dotted form to distinguish over the original characteristic. In a manner to be described, the filter characteristic can be adjusted to respond to selected frequencies occurring in any part of the spectrum under investigation.

Figure 2:
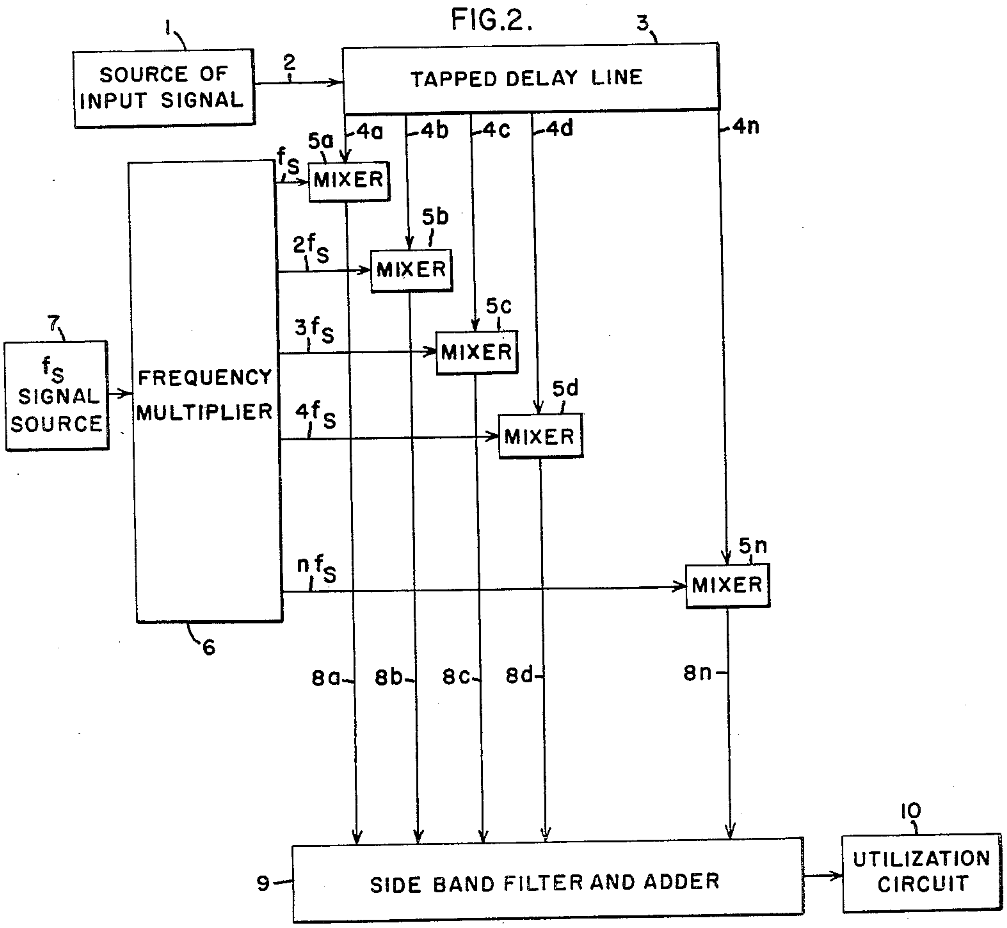
FIG. 2 illustrates in block diagram form a frequency scanning filter arrangement as disclosed in the aforementioned co-pending application, which is now a patent.

Referring to FIG. 2 there is shown a circuit arrangement useful in explaining one embodiment of the present invention. Signals, for example, of unknown frequency are applied over lead 2 from a source of signals 1 to a multitap delay line circuit 3. Circuit 3 may comprise an arrangement of lumped or distributed elements adapted to yield a signal available on input lead 2 at one of the multiple output taps 4 with an appropriate time delay. If one were to properly weigh each of the delayed outputs available on 4, then sum them up, at this point one would obtain the customary output from a static, transverse comb filter. Unfortunately, it has been previously mentioned the arrangement described thus far is static and the circuit has only limited usefulness. In order to accommodate signals of any frequency within the overall bandwidth under consideration, applicant has employed the following principles. As pointed out in the heretofore co-pending application, now a patent, of Sidney Applebaum, an output corresponding to having the comb filter characteristic, as for example shown in FIG. 1, scanned through the frequency domain under investigation, can be obtained by modifying each of the signals available on the output leads 4 in mixers 5 in accordance with a set of scanning signals available from sources 6 and 7, and then vectorially adding the modified signals available on leads 8 in circuit 9. The output from 9 is then applied to a utilization circuit 10. This technique permits rapid and efficient detection of signals of any frequency within the bandwidth under investigation. For further details of the functioning of the delay line and the scanning filter arrangement, reference should be made to the aforementioned co-pending application of Sidney Applebaum.

Figure 3:
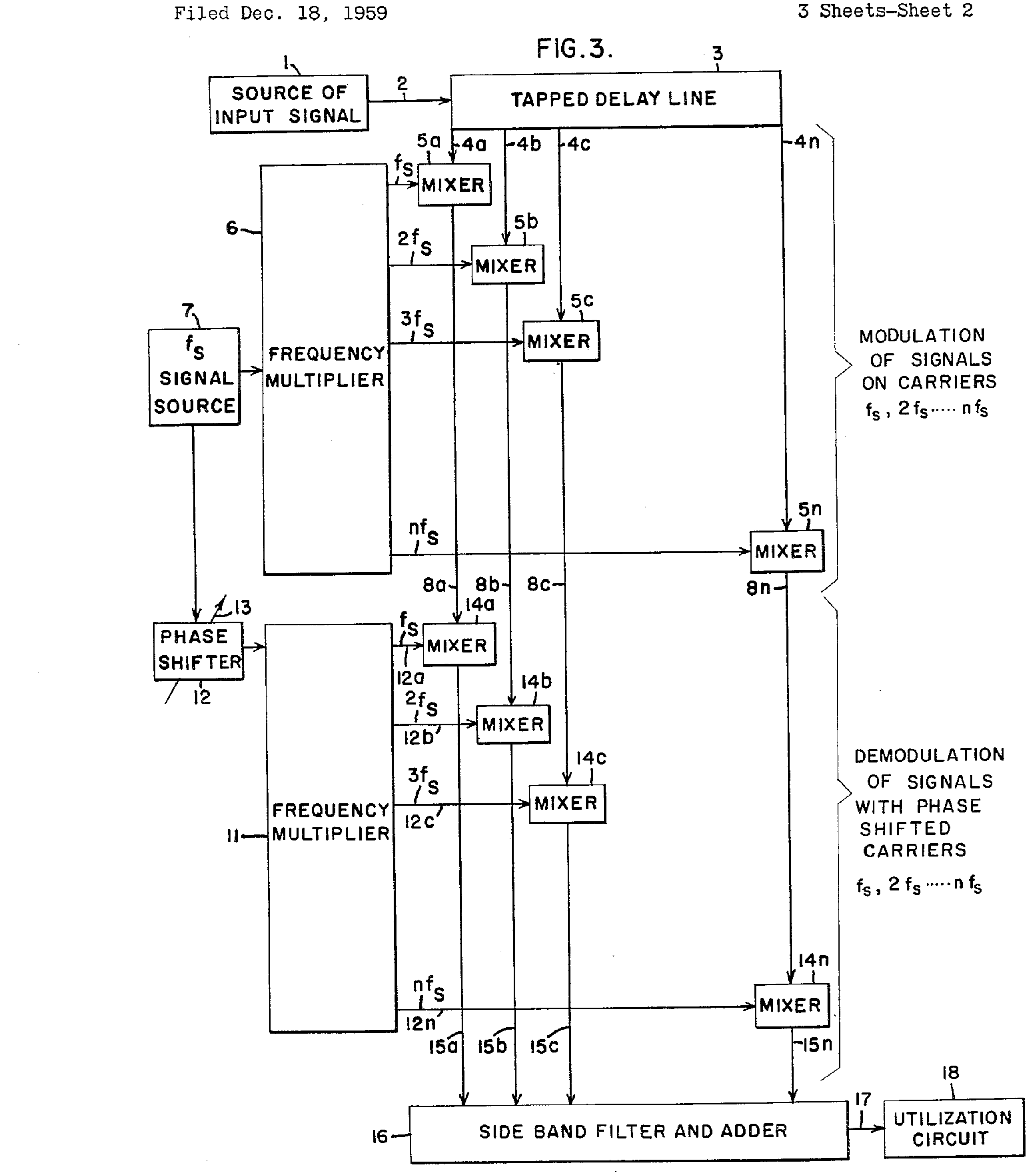
FIG. 3 illustrates in block diagram form a modification of the arrangement of FIG. 2 constiuting one embodiment of the present invention.

To adjust the pass characteristic of the comb filter arrangements such as shown in FIG. 2 to accommodate any desired frequency, as for example $f_4$ in FIG. 1, reference is made to the arrangement of FIG. 3. Wherever possible, common reference numerals have been retained in FIG. 3 to correspond with those shown in FIG. 2. The arrangement of FIG. 2 provided output signals available on lead 8 which exhibited equal increments of time delay and equal increments of angle between respective ones of said plurality of output signals, wherein the increment of angle is varied at the frequency $f_s$ available from source 7. The circuitry to be described operates to shift the frequency of the signals available on leads 8 back to their original frequency as appearing on leads 4, but with a relative phase shift between individual signals which can be adjusted independently of the scanning frequency $f_s$. For purposes of providing the desired and controllable phase shift between the individual signals there is provided a source of scanning frequency signals from source 11 whose output is available on the individual leads 12*a*, 12*b* . . . 12*n*. It should be noted that the frequency available on the individual output leads varies in accordance with the progression $f_s$, $2f_s$, $3f_s$ . . . $(n-1)f_s$ $nf_s$, where $n$ corresponds to the number of taps in the multitaps in the delay line. The source of scanning signals 11 may comprise any known arrangement. For further details of such a source, reference can be made to the aforementioned co-pending application, now a patent, of Sidney Applebaum.

By adjusting the phase shift provided by 13 the phase shift between signals available on lead 12 may be varied by control 13 over a 360° range with respect to the phase of the signals separating the waves available on leads 4. After mixing the signals available on leads 8 and 12 in 14, output signals of the frequency of signals available on lead 4 are applied over respective leads 15 to circuit 16. Upon being vectorially added in 16 a resultant output signal is made available on lead 17 for application to the utilization circuit 18. It should be noted that the spacing between the taps in the delay line circuit 3 determines the extent of the surveillance band and the particular portion of the band under observation or study is determined by the setting of the phase shifter 12. By adjusting the phase shifter, different portions of the frequency band under surveillance can be investigated. Accordingly, the phase shifter could be calibrated to read directly in frequency.

Figure 4:
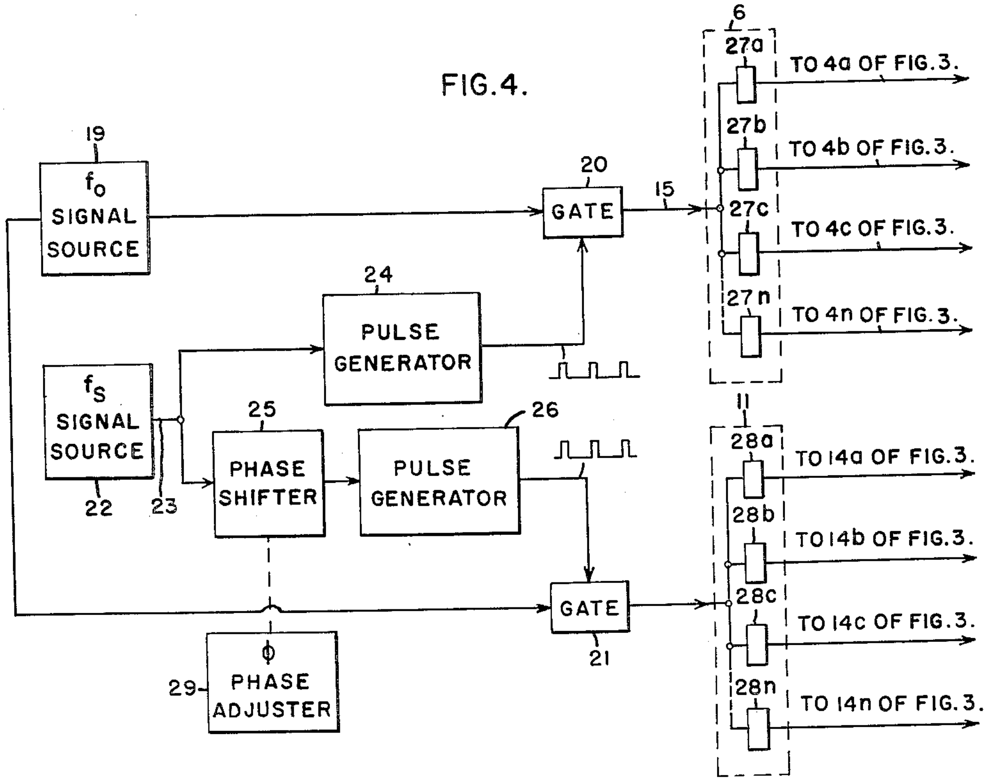
FIG. 4 illustrates in block diagram form method of obtaining selective phase shift control in accordance with one embodiment of the invention.

In a further embodiment the scanning frequency signals available from elements 6 and 11 may be derived from a common source 19 of signals of frequency $f_0$ as shown in FIG. 4. Wherever possible, common reference numerals have been retained in FIG. 4 to agree with those in FIG. 3. These signals are applied to gates 20 and 21 which are normally closed. A source 22 of signals of frequency $f_s$ provides such signals on lead 23 for application directly to pulse generator 24 and indirectly through a phase shifter 25 to a second pulse generator 26. The outputs of the pulse generators 24 and 26 operate respective gates 20 and 21 to pass signals of $f_0$ for the duration of the pulse periods to respective crystal filters 27*a*, *b*, *c* . . . *n* and 28*a*, *b*, *c*, . . . *n*. The crystal filters are tuned to selectively pass signals of the frequency associated with respective output leads. By setting the phase shifter 25 under control of 29 and the process of mixing in mixers 5 and 14, output signals are available on leads 15 having a fixed relative phase difference therebetween and having a frequency corresponding to that of the signals available on leads 4.

Figure 5:
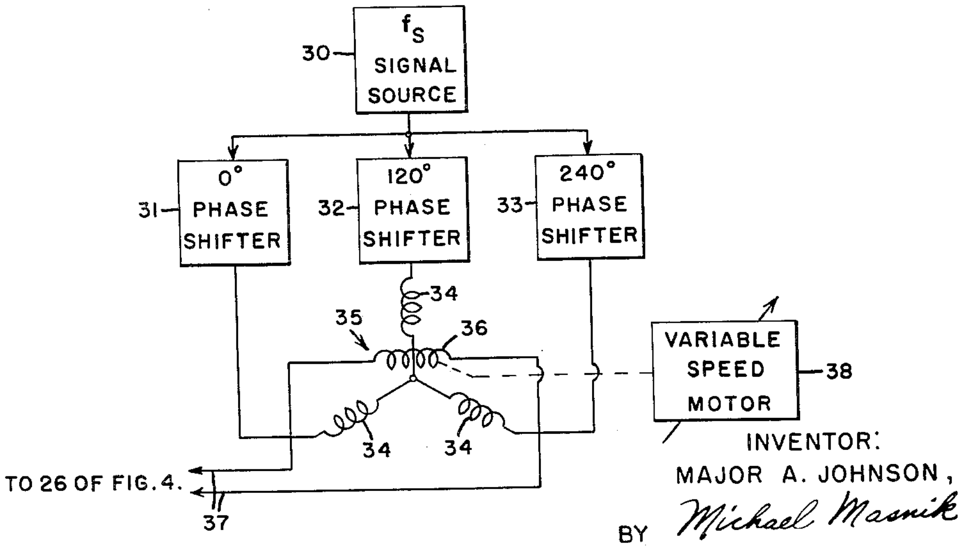
FIG. 5 illustrates a phase shifting arrangement useful in carrying out the invention.

Referring now to FIG. 5 there is shown an embodiment for accomplishing the phase shifting referred to in FIG. 4. Thus, output signals of frequency $f_s$ available from source 30 are applied through respective phase shifters 31–33 introducing relative phase shifts of 120° to the respective terminals of a stator winding 34 of an inductive phase shifter 35. Associated with the stator winding is a rotor winding 36 whose output is available on leads 37. By adjusting the position of the rotor 36 with respect to the stator winding 34, a desired phase shift may be introduced in the signal originally available from source 30 for application to pulse generator 25 of FIG. 4. In a further embodiment the rotor winding may be rotated at a desired rate under control of a variable speed motor 38. Thus, it is possible to scan the frequency band at a rate which is independent of the frequency $f_s$. As shown in the figure the speed of the motor can be controlled by element 39 to vary the speed or the motor can be stopped at any point in order to make a continuous investigation of a desired portion of the band.

While the arrangement of FIG. 3 was explained in terms of receiving signals on leads 4 for processing into signals available on lead 15, the invention can be practiced in the reverse direction also. For example, signals of common frequency having a first fixed phase angle difference between each of said signals may constitute input signals available on leads 15. After mixing in mixers 14 and 5 with modulating signals available from 12 and 7, output signals are provided on leads 4 having a common frequency. The phase angles of such output signals can be adjusted by adjusting the phase angles of signals available from 12 or 7, or both.

While the principles of the invention have now been made clear, there will be immediately obvious to those skilled in the art many modifications in structure, arrangement, proportions, the elements and components used in the practice of the invention, and otherwise, which are particularly adapted for specific environment and operating requirements without departing from those principles. The appended claims are therefore intended to cover and embrace any such modifications within the limits of the true spirit and scope of the invention.

What I claim and desire to secure by Letters Patent of the United States is:

1. In combination, a plurality of first signals of common frequency and given phase angles, a source of a plurality of second signals having a fixed frequency difference between each of said second signals, means for mixing each of said first signals with a respective second signal to provide third signals, a source of a plurality of fourth signals having said fixed frequency difference between each of said fourth signals and an adjustable phase angle, means for mixing said each of said third signals with a respective one of said fourth signals to derive fifth signals, and means for adjusting the phase angle of said fourth signals.

2. In combination, a plurality of first signals of common frequency and given phase angles, a source of second signals of fixed frequency and given phase angle, means responsive to said second signals for producing a plurality of third signals having a fixed frequency difference between each of said third signals, means for mixing said first signals and third signals to provide fourth signals, a source of fifth signals of said fixed frequency and an adjustable phase angle, means responsive to said fifth signals to provide sixth signals of fixed frequency difference, means for mixing said fourth and sixth signals to provide seventh signals, and means for adjusting the phase angle of said fifth signals.

3. In combination, a plurality of first signals of common frequency with a fixed phase difference between each of said first signals, a source of second signals of fixed frequency, means responsive to said second signals for producing a plurality of third signals having a fixed frequency difference between each of said third signals, means for mixing said first signals and third signals to provide fourth signals, means for phase shifting said second signals, means responsive to said phase shifted second signals to provide fifth signals of fixed frequency difference, means for mixing said fourth and fifth signals to provide sixth signals, means for vectorially adding said sixth signals to provide output signals, means for utilizing said output signals, and means for adjusting said phase shifting means to provide said sixth signals with a common phase angle.

4. In combination, a plurality of first signals, means for deriving a plurality of signals having frequency components proportional to the phase angle difference between each of said first signals, means for mixing each of said first signals with a respective one of said derived signals to provide respective mixed signals, means for deriving third signals having frequency components proportional to the phase angle difference of each of said first signals but with an adjustable phase angle difference between each of said third signals, means for mixing each of said third signals with a respective one of said mixed signals to provide resultant signals, and means for adjusting the phase angle difference of each of said third signals such that said resultant signals have additive phases.

5. In combination, a plurality of first signals, means for deriving a plurality of signals having frequency components proportional to the phase angle difference between each of said first signals, means for mixing each of said first signals with a respective one of said derived signals to provide respective mixed signals, means for deriving third signals having frequency components proportional to the phase angle difference of each of said first signals but with an adjustable phase angle difference between each of said third signals, means for mixing each of said third signals with a respective one of said mixed signals to provide resultant signals, and means for adjusting the phase angle difference of each of said third signals such that said resultant signals have additive phases.

6. In combination, a source of a plurality of input signals of common frequency and given phase angle, a control source of a plurality of first scanning frequency signals having a fixed frequency difference between each of said first signals, means for mixing each said input signal with a respective first signal to provide intermediate signals, a control source of second scanning frequency signals having said fixed frequency difference between each of said second signals, means for mixing said intermediate signals and said second signals to derive output signals of common frequency, and means for adjusting the phase angles of said output signals comprising means for adjusting the phase angles of at least the signals available from one of said control sources.

7. An arrangement for processing an input signal of given frequency, comprising means for successively time delaying and angle modifying said input signal in a predetermined sequence to provide a plurality of output signals having equal increments of time delay and equal increments of angle between respective ones of said plurality of output signals, and wherein said equal increments of angle vary as a predetermined function of time, means for angle modifying each of said output signals in a predetermined sequence to provide a plurality of output signals having equal increments of time delay and equal increments of angle between respective ones of said plurality of output signals and wherein said increment of angle is adjustable independent of said predetermined function of time.

8. An arrangement for processing an input signal occurring within a band of frequencies comprising means for successively time delaying said input signal by equal increments of time which are independent of frequency of said input signal and for shifting the frequency of said input signal by equal increments of frequency from an original frequency value to derive a plurality of time delayed, frequency shifted signals, means for frequency shifting said plurality of time delayed and frequency shifted signals to derive a plurality of resultant signals having said original frequency but with a fixed phase difference between each of said last named signals, and means for controlling said relative phase.

9. In combination, a plurality of first signals of common frequency but with a first phase difference between each of said first signals, means for shifting the frequency of each of said first signals to provide second signals having a fixed frequency difference between each of said second signals, and means for shifting the frequency of each of said second signals to provide third signals having said common frequency but with a second phase difference between each of said third signals.

References Cited in the file of this patent

UNITED STATES PATENTS

| | | |
|---|---|---|
| 2,297,543 | Eberhardt et al. | Sept. 29, 1942 |
| 2,640,105 | Bennett | May 26, 1953 |
| 2,680,151 | Boothroyd | June 1, 1954 |
| 2,685,676 | Williams | Aug. 3, 1954 |
| 2,881,320 | Goldberg | Apr. 7, 1959 |
| 2,897,442 | Wright et al. | July 28, 1959 |
| 2,947,945 | Relis et al. | Aug. 2, 1960 |